Aug. 15, 1939.  L. GOLD  2,169,975
LAMINATING APPARATUS
Filed Jan. 8, 1936  2 Sheets-Sheet 2
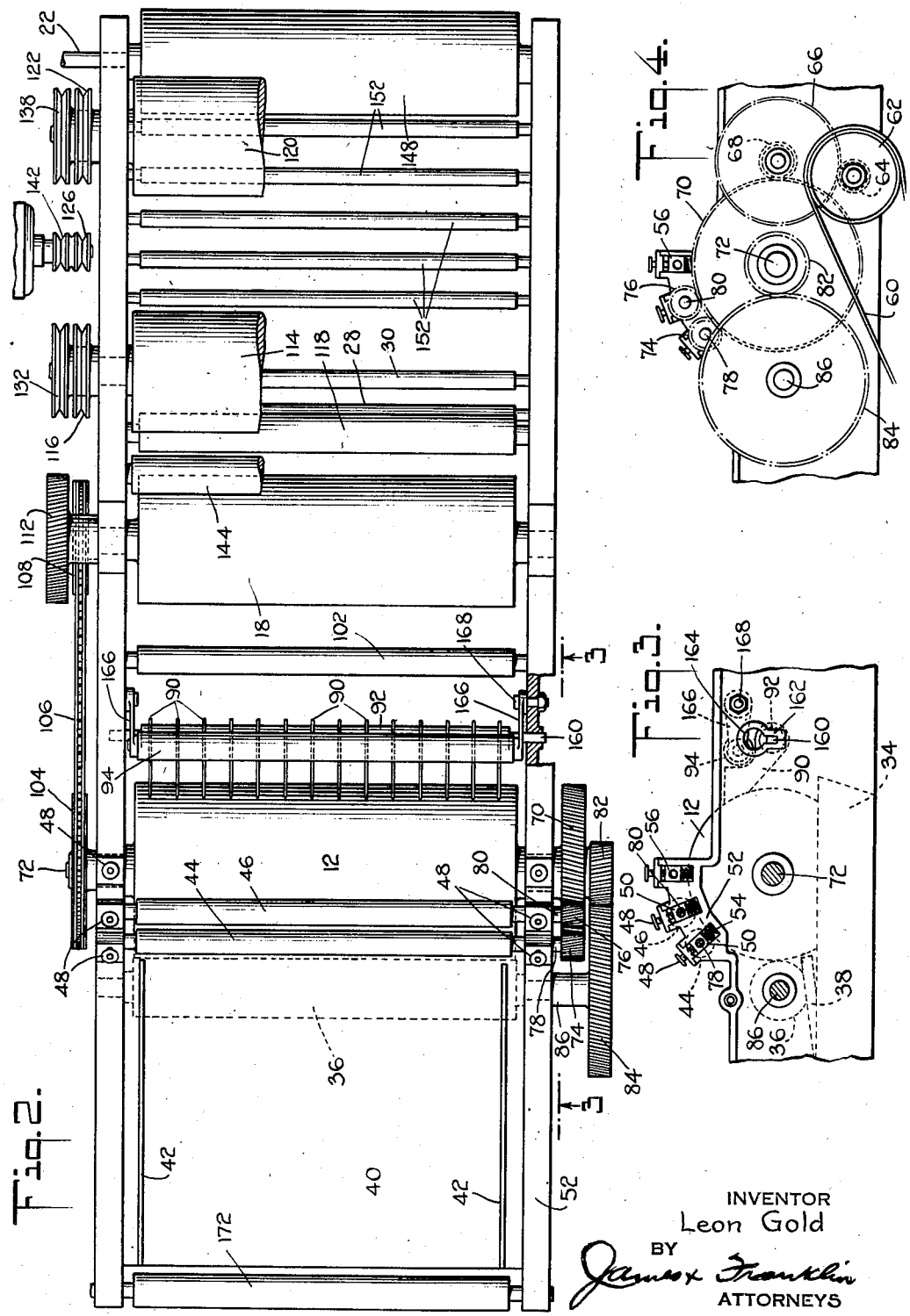
INVENTOR
Leon Gold
BY
ATTORNEYS Patented Aug. 15, 1939

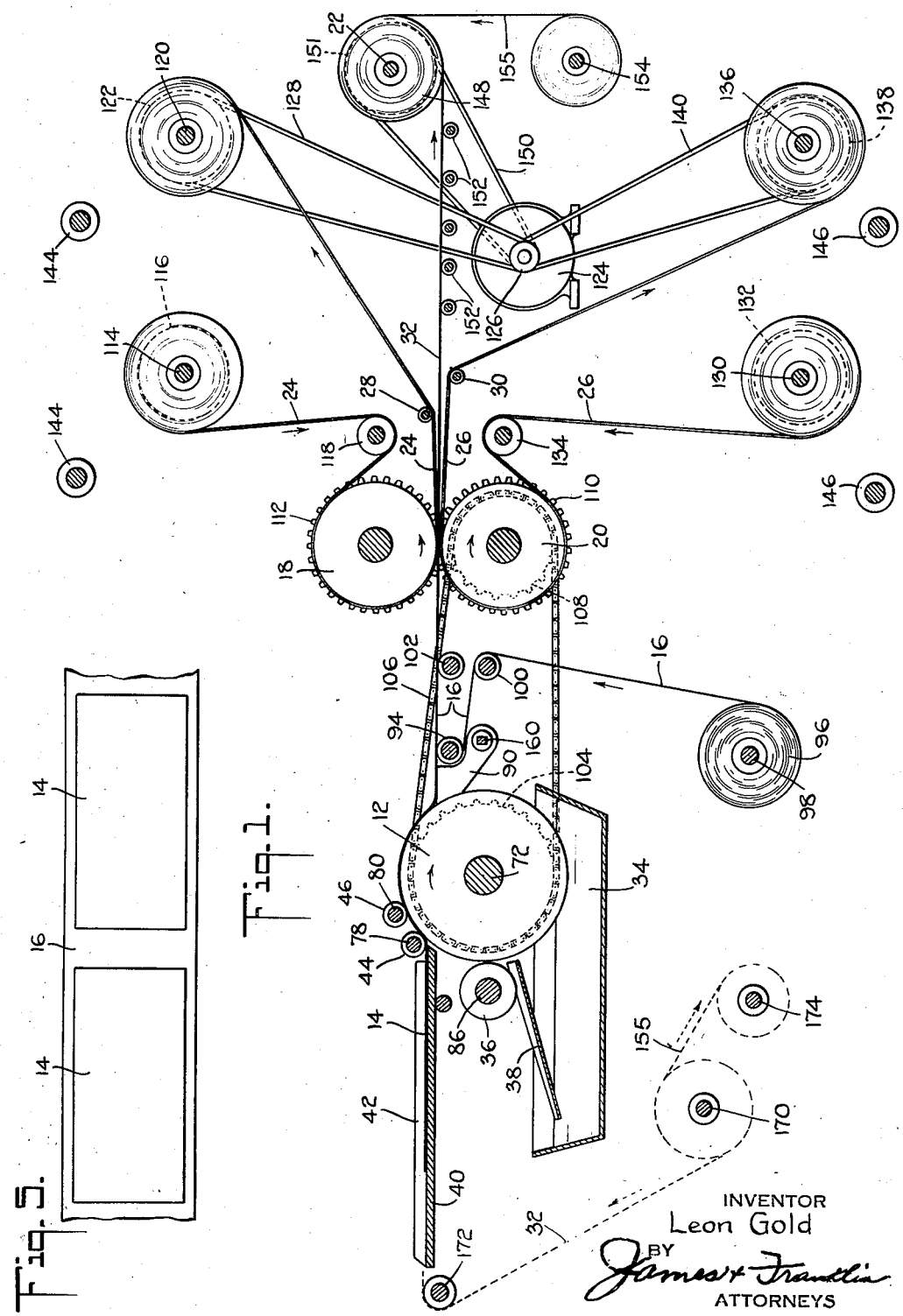

2,169,975

UNITED STATES PATENT OFFICE 2,169,975

LAMINATING APPARATUS

Leon Gold, Brooklyn, N. Y., assignor of one-half to Moses Krivis, Brooklyn, N. Y.

Application January 8, 1936, Serial No. 58,060

8 Claims. (Cl. 154—36)

This invention relates to lamination of sheet materials, and more particularly the lamination of a base or foundation material with transparent cellulose paper.

The primary object of my invention is to generally improve liminating processes and apparatus. A more particular object is to facilitate the lamination of separate sheets of paper, in contradistinction to a continuous web, and for this purpose I find it preferable to employ a continuous web of material for the added lamination, this web making it possible to handle the various operations as a continuous process. Another object of my invention is to make possible successful and satisfactory permanent adhesion of transparent cellulose paper to other stock.

As is well known to those skilled in the art, it is exceedingly difficult to successfully and permanently adhere transparent cellulose paper to other sheet stock, and to obtain a surface union therebetween which is continuous and unmarred by streaks, blisters, and the like. Another difficulty which arises during the lamination of materials is caused by the extrusion of excess cement from the edges of the material when pressing the same together. This difficulty is particularly acute when laminating separate sheets to a continuous web because the cement is extruded on all four edges of the sheet and tends to be deposited directly on the pressure rolls, thereby ruining subsequent operation of the apparatus. The problem in question is increased in severity when laminating transparent cellulose stock, as aforesaid, for the reason that in order not to mar the appearance of the foundation being covered or protected by the transparent cellulose paper, the adhesive should be spread uniformly over the entire surface to prevent separation, streaks, and blisters, yet the film of adhesive must be exceedingly thin. I find it possible to reconcile these conflicting requirements by initially applying a generous coating of adhesive and subsequently squeezing all of the excess adhesive from between the sheets, but manifestly this procedure aggravates the objectionable deposit of adhesive on the pressure rolls and other parts of the apparatus. Still another problem which arises when attempting to laminate transparent cellulose material is the tendency of the material to generate an electric charge or static, which in turn causes the same to adhere to the adjacent pressure roll contacting therewith, thus leading to separation of the parts of the embryo laminated stock.

I have discovered that all of the foregoing difficulties may be overcome by the use of moving webs of absorptive material, which, for convenience, may be referred to as blankets. The blankets are preferably made of kraft paper, but other relatively porous or absorptive paper, or even fabric, may be employed. In some cases, as where the separate sheets are substantially smaller than the continuous web, it is possible to use only a single blanket, this being disposed on the side of the small sheets in order to contact and immediately absorb all excessive adhesive squeezed from between the sheets and web. However, I prefer to make the arrangement perfectly symmetrical and to use blankets on both sides of the laminated stock.

Further objects of my invention are to obtain an adequate length of blanket to insure substantial continuity when practicing the invention, and to facilitate repeated use of the blankets until their absorptive properties have been substantially exhausted. To this end, the blankets are fed from supply drums to take-up drums, the latter preferably being motor driven, and when the supply drums are exhausted, the blankets are reversed in direction, that is, they are fed from the former take-up drum to the former supply drum, the motor drive then being changed from the former take-up drum to the former supply drum.

Other objects of my invention center about the cement applying mechanism, and are to prevent the formation of bubbles and to minimize streaking or damage which might be caused by specks of dirt in the adhesive. With these objects in view, I provide a doctor roll and a downwardly inclined bubble tray forming an inclined path from the doctor roll to the reservoir of adhesive. The use of a doctor roll minimizes the effect of dirt or solid matter which, instead of being retained in place against the cement roll, is carried around and washed from the doctor roll, while the bubble tray prevents dropping of the adhesive and consequent formation of bubbles.

To the accomplishment of the foregoing and such other objects as will hereinafter appear, my invention consists in the laminating process and apparatus therefor, and their relation one to the other, as hereinafter are more particularly described in the specification and sought to be defined in the claims. The specification is accompanied by drawings in which:

Fig. 1 is a section taken in elevation through apparatus embodying features of my invention;

Fig. 2 shows the said apparatus in plan;

Fig. 3 is a side elevation of a part of the apparatus, taken in the plane of the line 3—3 of Fig. 2, that is, with the gearing removed;

Fig. 4 is a similar elevation but showing and explanatory of the gearing; and

Fig. 4 illustrates the invention as applied specifically to the lamination of book jackets.

Referring to the drawings and more particularly to Fig. 1, the apparatus of my invention comprises a cementing roll 12 for applying a suitable adhesive to one of the layers of material, which may be in the form of separate sheets, as indicated at 14, and for feeding the same to the other lamination which is preferably a continuous web, as indicated at 16. The combined or laminated web is then fed between upper and lower pressure rolls 18 and 20 where the laminations are squeezed tightly together and all excess adhesive is extruded. The resulting laminated material is then wound on a suitable take-up drum 22.

In accordance with my invention, upper and lower blankets or webs 24 and 26 of relatively porous highly absorbent material are fed along with the laminated web on opposite sides thereof between the pressure rolls 18 and 20. These blankets absorb all excess adhesive as it is squeezed from between the sheets. The blankets effectually shield the pressure rolls from contacting with the adhesive, thus keeping the same perfectly clean even after long operation. The blankets further function to keep the laminated product clean, for the excess adhesive is drawn away from the edges and cannot spread thereover. It will be noted that the blankets, on leaving the pressure rolls, are guided by guide rollers 28 and 30 which position the blankets nearly horizontally for an appreciable distance from the pressure rolls. This insures accurate and dependable feed of the laminated stock away from the pressure rolls, and definitely prevents clinging of the stock to one roll or the other, or resulting separation of the laminations such as is frequently caused by the generation of an electric charge or static. It will be noted, however, that guide rollers 28 and 30 are displaced somewhat above and below the laminated web 32, this being desirable in order to obtain a fairly quick separation of the blankets from the web in order to prevent adhesion therebetween. A further and incidental advantage when using blankets is the cushioning effect caused thereby, which makes up for any slight irregularity or changes in thickness of the stock.

Transparent cellulose paper, made of regenerated cellulose or a cellulose ester, such as the products known commercially as "Cellophane" and "Kodapak", are particularly subject to warping caused by uneven stretch and the effects of static electricity; and both difficulties are satisfactorily overcome by using the blankets here described.

Considering the apparatus in greater detail the cement roll 12 runs in a bath 34 of a suitable adhesive which, when dealing with transparent cellulose paper, should, of course, be transparent. I have found any of a number of lacquers suitable for this purpose. The cement picked up on roll 12 is reduced to desired amount by a doctor roll 36. A tray 38 is disposed immediately beneath the doctor roll and leads at a gradual incline to the reservoir of cement. Tray 38 eliminates drop of the excess cement taken from roll 12 by doctor 36. I find that this precaution prevents the formation of bubbles which otherwise may lead to blisters and bare spots in the laminated product. Although only a thin film of adhesive is to be left between the laminations, I find it entirely feasible to so space the cement and doctor rolls as to obtain a substantial application of adhesive, for the excess is subsequently taken care of by the blankets 24 and 26. The use of an adequate coating of adhesive is desirable because it insures a uniform and continuous coating between the laminations, and this is especially important when laminating transparent material.

For convenience, the invention will be described hereinafter as specifically applied to the lamination of book jackets, but it will be understood that this example is selected merely by way of illustration and not limitation of the invention. The book jackets are in separate sheet form. The jacket, marked 14, is fed over a suitable table 40 to cement roll 12. The direction of the jacket is appropriately guided by one or more fences 42 mounted on table 40. The jacket is fed in contact with cement roll 12 by suitable feed rolls 44 and 46. As will be seen by reference to Fig. 3, these rolls are adjustably spaced with relation to cement roll 12 by means of adjusting screws 48 which bear on suitable bearing blocks 50 slidably received in mating ways on the frame 52. The blocks are normally urged outwardly against adjusting screws 48 by suitable compression springs 54.

It will be noted in Fig. 3 that a third set of bearing blocks 56 is provided, adapted to carry another feed roll which, however, may be omitted when dealing with flexible sheet material such as ordinary paper. It may be mentioned, however, that when laminating the cellulose paper to sheets of relatively stiff material such as cardboard, ply wood, etc., a feed roll is placed in blocks 56 and the preceding feed rolls may be removed, the cardboard being fed directly between the single top feed roller and the cement roll. This change is made, of course, simply with a view to minimizing the necessary bending of the material during the application of adhesive thereto.

The manner in which the parts so far discussed are driven, will be clear on examination of Fig. 4. The apparatus is driven by a suitable motor, not shown, which is connected by a belt 60 to a pulley 62 with which rotates a pinion 64 which in turn meshes with a gear 66. Gear 66 has associated with it a pinion 68 which in turn meshes with a gear 70 mounted on the shaft 72 which carries the glue roll 12. Gear 70 meshes with pinions 74 and 76 mounted on shafts 78 and 80 of feed rollers 44 and 46, respectively. The pitch diameters of gear 70 and pinions 74 and 76 preferably equal the diameters of glue roll 12 and feed rollers 44 and 46, respectively, thereby insuring equal peripheral speeds. The glue roll shaft 72 carries a pinion 82 which meshes with a gear 84 mounted on the shaft 86 of the doctor roll 36. The speed ratio in this case is so selected as to obtain a difference in surface speed which causes wiping of excess adhesive from the cement roll.

Reverting now to Figs. 1 and 2, the cemented sheet or book jacket is stripped from roll 12 by stripper fingers 90 a series of which are distributed along and ride loosely upon a support rod 92. The stripper fingers are preferably cut away or shaped, as shown in Fig. 1, in order to receive a guide roller 94 which is disposed as closely as is conveniently possible to the ends of the stripper fingers.

The continuous web or lamination, in this case the cellulose material, is drawn from a suitable roll or supply 96 carried on a loose supply drum 98, and is fed around a guide roller 100 to the guide roller 94 previously mentioned. The web then passes to the right, as viewed in Fig. 1, and extends between pressure rolls 18 and 20 which operate to draw the web therethrough at a speed synchronized with the surface speed of cement roll 12. It will be understood that the cemented sheet or book jacket is guided by stripper fingers 90 to the traveling web 16 and is spread upon and adhered to the web sufficiently to reach the pressure rolls 18 and 20. If desired, an intermediate idle or guide roller 102 may be provided between guide roller 94 and the pressure rolls.

Pressure roll 20 is positively geared to cement roll 12 for synchronous operation, by suitable gearing here exemplified by a sprocket gear 104 on shaft 72 connected through a sprocket chain 106 to a sprocket gear 108 on the shaft of pressure roll 20. The ratio of sprocket gears 104 and 108 is made equal to the ratio of the diameters of cement roll 12 and pressure roll 20. This shaft also carries a gear 110 meshing directly with a similar gear 112 on the shaft of the upper pressure roll 18. It will be understood that the pitch diameters of gears 110 and 112 are equal to the diameters of pressure rolls 18 and 20, thereby insuring equal linear speeds. It will be noted that gears 110 and 112 are preferably provided with helical teeth, and similar remark applies to the various gears previously referred to in connection with the cementing mechanism, in order to obtain smooth uniform motion of all of the working surfaces of the various rollers.

Blankets 24 and 26 preferably consist of soft absorptive paper, such as large rolls of kraft paper. Blanket 24 is fed from a supply drum 114 which is idle, although its shaft is provided with a pulley 116 (Fig. 2). The blanket is led around a guide roller 118 and thence around pressure roll 18. Guide roller 118 causes the blanket to ride in contact with most of the periphery of the pressure roll, thereby insuring positive drive of the blanket. The blanket then passes around guide roller 28 previously referred to, and is led to a take-up drum 120 the shaft of which carries a pulley 122 (Fig. 2). This pulley is driven by a motor 124 through a suitable slip connection here exemplified by a pulley 126 and a relatively loose belt 128, but it will be understood that, if desired, a more elaborate form of slip clutch may be used on either pulley. It will also be understood that while, for convenience, I prefer to drive take-up roll 120 by means of a motor 124 separable from the main driving motor, it is also possible to drive the take-up rolls from the latter motor, thus using only a single source of power. It will further be understood that motor 124 is not intended to and does not provide a true drive for blanket 24 but rather is intended merely to take up the slack caused by the drive of blanket 24 through the pressure rolls 18 and 20.

The bottom blanket 26 is handled by apparatus generally similar to that previously described. The blanket is taken from a supply drum 130 the shaft of which is provided with a pulley 132 (see Fig. 2). The blanket passes over a guide roller 134 and thence around pressure roll 20 to guide roller 30, and the slack is taken up on a suitable take-up drum 136 provided with a pulley 138 (see Fig. 2). The latter is driven through a suitable slip connection (here exemplified by a loose belt 140) by motor 124. The motor shaft has a pulley 142 which receives belt 140.

In order to facilitate reverse feed of the blankets without requiring removal or handling of the large heavy rolls of kraft paper, I locate motor 124 symmetrically with respect to the supply and take-up drums heretofore referred to. In this manner, motor 124 may be used to drive either set of drums. For example, when the blankets have been unwound from drums 114 and 130 and wound upon drums 120 and 136, it is simply necessary to remove belt 128 from pulley 122 and to instead apply the same to pulley 116. Similarly, belt 140 may be removed from pulley 138 and applied to pulley 132. At the same time, the end of each blanket must be threaded through the machine in reversed direction, and to insure suitable clearance of the parts, I provide extra idle or guide rollers 144 at the top of the machine and corresponding guide rollers 146 at the bottom of the machine. The end of blanket 24 is led from drum 120 upwardly over rollers 144, then downwardly around roller 118, then around pressure roll 18 to guide roller 28, and thence upwardly to drum 114. The end of blanket 26 is led from drum 136 downwardly and around rollers 146, then upwardly to roller 134, then around feed roller 20 to guide roller 30, and thence downwardly to drum 130.

Motor 124 is also used to take up or reel the laminated product. To this end, take-up drum 22 is provided with a pulley 148 (not shown in Fig. 2 because it comes outside the margin of the drawings) connected by a belt 150 to a pulley 151 on the remote end of the motor shaft. Like the other take-up drums, take-up drum 22 is preferably driven with a slip connection here exemplified by making the belt 150 relatively loose.

Take-up drum 22 is preferably spaced remotely from pressure rolls 18 and 20 in order to provide adequate time for the adhesive to dry. This distance has been shortened in the drawings, but it will be understood that it may be increased to any desired amount, the laminated web meanwhile being supported by a series of suitable guide rollers 152. If desired, the distance needed may be shortened by the use of artificial drying apparatus, such as a tunnel with appropriate blower mechanism. The necessity for thorough drying of the product may be avoided by slip-sheeting the web when reeling the same on take-up drum 22. Specifically, I provide a drum 154 carrying a roll of kraft paper or other suitable stock, and this is wound on drum 22 together with the laminated web.

The stripper fingers 90 are preferably made accessible and removable so that they may be cleaned and ground, or replaced if so nicked or bent that the sheets are not picked from the cement roll in a smooth, clean, and dependable manner. For this purpose, the ends of the rod 92 carrying the stripper fingers 90 are squared, as indicated at 160, and are received in mating slots 162 (Fig. 3) provided in the frame of the machine. These slots are enlarged at 164 so that rod 92 may be elevated to the enlargement and then removed. It is preliminarily necessary to move guide roller 94 out of the way, and to this end the guide roller is mounted on arms 166 (Figs. 2 and 3) the opposite ends of which are pivotally secured to the frame by suitable bolts 168. It will be manifest that by loosening bolts 168 and swinging guide roller 94 to a position opposite that shown, the stripper fingers are cleared for ready removal.

Referring now to Fig. 5, I show book jackets 14 cemented to the transparent cellulose web 16. It will be noted that web 16 is wider than jacket 14, and this is particularly desirable when covering book jackets for libraries, or in any case where the book jackets have already been cut to true dimension. The arrangement possesses the further advantage that book jackets of varying width may be fed through the apparatus. When laminating book jackets for a publisher, the jackets are preferably laminated before they are trimmed to proper dimension, and in such case it is not necessary for the web 16 to be wider than the jacket, and, in fact, it may be narrower so long as it is not narrower than the finished dimension of the jacket. It will be understood that in either case the parts are subsequently severed and trimmed to proper dimension.

I have heretofore mentioned that the apparatus may be used for laminating continuous webs of sheet material as well as separate sheets and a web. This may be illustrated in connection with book jackets, for when book jackets are prepared for library purposes, it is desirable to cement a sheet of strong backing paper, for example kraft paper, to the inside of the jacket, in addition to cementing transparent paper to the outside of the jacket. Referring to Fig. 1, the apparatus is provided with a supply drum 170 and a guide roller 172 at one end of table 40. When dealing with a web instead of separate sheets, a supply roll of the web is placed on drum 170 and is fed over guide roller 172 to the cementing mechanism.

In the present case the take-up roll on drum 22 with its slip sheet of kraft paper, is physically transferred from drum 22 to drum 170. The laminated web 32 is fed from the roll to the cementing apparatus and at the same time the slip sheet 155 is taken up on a suitable take-up drum 174 which is driven by a slip connection or loose belt from the shaft of drum 170 or from any desired available shaft in the gear train heretofore described in connection with Fig. 4. The supply of paper on drum 98 is changed from transparent cellulose paper to kraft paper. The kraft paper is thus cemented on the back of the book jackets, the transparent cellulose web being left on the front or opposite side of the book jackets.

It is believed that the operation as well as the many advantages of my improved laminating method and apparatus, will be apparent from the foregoing detailed description thereof. Separate sheets may be laminated to a continuous web. Difficult stock such as "Cellophane" and "Kodapak" may be successfully handled and smoothly and permanently adhered to other stock. The resulting product is clean, all excessive adhesive being absorbed by the blankets. The apparatus functions indefinitely without difficulty such as would be caused by adhesive reaching the pressure rolls or other parts of the apparatus. Difficulty caused by the generation of static electricity is overcome. A perfectly uniform yet thin transparent coat of adhesive is obtainable, for an adequate supply may be applied initially and the excess squeezed out under sufficient pressure. The blankets may be used repeatedly until fully loaded with adhesive. The direction of operation of the blanket is reversible without physically handling or transferring the rolls. When laminating separate sheets, the adhesive may be squeezed from the transverse as well as the longitudinal edges of the sheets, yet is successfully absorbed by the blankets, and raises no difficulty. The successive sheets may differ in dimension, thus making the location of the lines of adhesive a variable, without in any way complicating the process or messing the product.

It will be understood that while I have mentioned lacquer as an adhesive, other adhesives may be used, depending upon the nature of the materials being laminated, and even in the case of transparent cellulose paper, depending upon the particular paper used and whether or not water-proofed, and, if water-proofed, the nature of the coating used on the cellulose paper for that purpose.

It has already been mentioned that the transparent cellulose paper may be applied to stiff as well as flexible sheets of material. For example, stiff or backed pictures may be laminated for sale at low cost, in lieu of protecting the same with glass. It will be understood that for this purpose the laminated web is not reeled on a take-up drum but is instead severed between the successive sheets and stacked by hand, or by using an appropriate conveyor mechanism. Even when using flexible sheets, for example book jackets, the successive sheets may be severed without a preliminary reeling operation. Thus, when laminating book jackets for a publisher rather than for libraries, so that the jackets are to be of uniform dimension and require no inside backing of kraft or other strengthening paper, the web, after leaving the pressure rolls and becoming sufficiently dry, is run past stationary trimmer knives which trim the margins, leaving a web of desired width, after which the web may be transversely severed either manually or automatically by a rotary shearing knife.

Absolute synchronism of the working parts during the laminating operation is essential in order to obtain a smooth finished product and in order to prevent any slight displacement of one lamination with respect to the other which ordinarily will spread and blur the colors and printing on the book jacket or other product being laminated. The use of gears with helical teeth, while not essential, is for this reason desirable. The pressure rolls are preferably made of smooth polished metal, and while rubber rolls may be used, the metal rolls are more accurate and introduce no difficulties because the blankets themselves provide a slight though adequate cushioning between the rolls and the laminated product.

While I have illustrated the motor for taking up the slack of the blankets as being located symmetrically with respect to the supply and take-up drums, it will be manifest that the pulleys 126 and 142 may be located symmetrically as shown yet the motor placed elsewhere if more convenient. Moreover, mechanical gearing with slip clutches may be used instead of belts, the clutches being so arranged as to make possible the application of power to either set of drums at will.

It will therefore be apparent that while I have shown and described my invention in preferred form, many changes and modifications may be made without departing from the spirit of the invention, defined in the following claims.

I claim:

1. Laminating apparatus comprising a table for sheet material feed, a cement applying roll for the sheet material, a cement bath, a doctor roll, feed rollers, means to positively drive said cement roll, doctor roll, and feed rollers, stripper fingers at the cement roll, a supply drum for a web of transparent non-fibrous cellulosic material such as cellulose ester or regenerated cellulose, and means to feed a continuous web of material from the supply drum to a point immediately adjacent the stripper fingers and then away from the stripper fingers, whereby sheet material fed to the cement roll is directly thereafter superimposed on the continuous web of material.

2. Laminating apparatus comprising upper and lower pressure rolls, means to feed freshly cemented laminations of relatively non-absorbent material between said pressure rolls, upper and lower supply drums for long blankets of absorptive material, upper and lower take-up drums for said blankets, suitable guide rollers for guiding the upper blanket from the supply drum around most of the periphery of the upper pressure roll and thence to the upper take-up drum, the guide roller following the pressure roll being so located that the said blanket is gradually separated from said laminations immediately following the pressure rolls, corresponding guide rollers for the lower blanket, means for driving the take-up drums through appropriate slip connections, and means for positively, synchronously driving the pressure rolls.

3. Laminating apparatus for handling comparatively non-absorptive materials, comprising cementing apparatus, means to feed a lamination therethrough, means to combine the laminations, pressure rolls, two long webs of heavy porous paper, supply rolls therefor, take-up rolls therefor, guide rollers to feed one of the webs from its supply roll directly around one of the pressure rolls and thence to its take-up roll, guide rollers to feed the other web directly around the other pressure roll and thence to its take-up roll, means to feed the combined laminations therebetween, some of said guide rollers functioning to at least somewhat separate the webs from the combined laminations immediately following the pressure rolls, and gear means to positively drive the cementing apparatus and the pressure rolls in synchronism.

4. Laminating apparatus for handling comparatively non-absorptive materials, comprising upper and lower pressure rolls, means to feed copiously cemented laminations between said pressure rolls, one of said laminations being made of glossy transparent non-fibrous cellulosic material such as cellulose ester or regenerated cellulose, long upper and lower blankets of absorptive material such as soft porous paper, supply rolls therefor, take-up rolls therefor, and means to feed the blankets from the supply rolls in synchronism with the laminations and the pressure rolls to their respective take-up rolls, the blankets being disposed on each side of the laminations between the laminations and the pressure rolls.

5. Apparatus for laminating sheet material and a continuous web of glossy transparent non-absorptive material such as cellulose ester or regenerated cellulose, comprising cementing apparatus to apply excess adhesive to one of the laminations, means to combine the sheet material and the continuous web, pressure rolls between which the resulting lamination of sheet material and web is fed, means to drive the cementing apparatus and the pressure rolls in synchronism, at least one very long blanket of absorptive material such as soft porous paper, a supply roll therefor, a take-up roll therefor, and means to feed the blanket from the supply roll between the pressure rolls and the laminated materials to the take-up roll.

6. Laminating apparatus comprising a table for sheet feed, a cement applying roll for the sheets, a cement bath, a doctor roll, a feed roller, means to positively drive said cement roll, doctor roll, and feed roller, stripper fingers at the cement roll, a supply drum for a web of transparent non-fibrous cellulosic material such as cellulose ester or regenerated cellulose, means to feed a continuous web of material from the supply drum to a point immediately adjacent the stripper fingers and then away from the stripper fingers, whereby sheets of material fed to the cement roll are directly thereafter superimposed on the continuous web of material, pressure rolls to which the laminated material is fed, means positively driving one of the pressure rolls in synchronism with the cementing roll, a very long absorbent blanket made of soft porous paper or other suitable material, a supply roll for said blanket, a take-up roll for said blanket, and means to feed the blanket from the supply roll around most of the periphery of a pressure roll and finally to the take-up roll.

7. Laminating apparatus comprising upper and lower pressure rolls, means to feed freshly cemented laminations of relatively non-absorbent material between said pressure rolls, a supply drum for a long blanket of absorptive material, a take-up drum for said blanket, suitable guide rollers for guiding said blanket from the supply drum around a pressure roll and finally to the take-up drum, driving means for driving the take-up drum through appropriate slip connections, means whereby the feed of the blanket at the drums may be reversed while still feeding the laminations together with the blanket through the pressure rolls in the original direction, the blanket then being fed from the former take-up drum acting as a supply drum to the former supply drum acting as a take-up drum, and means whereby the driving means may be disconnected from the former take-up drum and connected to the former supply drum.

8. Laminating apparatus comprising upper and lower pressure rolls, means to feed freshly cemented laminations of relatively non-absorbent material between said pressure rolls, a supply drum for a light blanket of absorbent material, a take-up drum for said blanket, suitable guide rollers for guiding the blanket from the supply drum around most of the periphery of a pressure roll, and finally to the take-up drum, the guide roller immediately following the pressure roll being so located that the said blanket is gradually separated from said laminations immediately following the pressure rolls, means for driving the take-up drum through appropriate slip connections, and means for positively synchronously driving the pressure rolls.

LEON GOLD.